Patented Mar. 13, 1923.

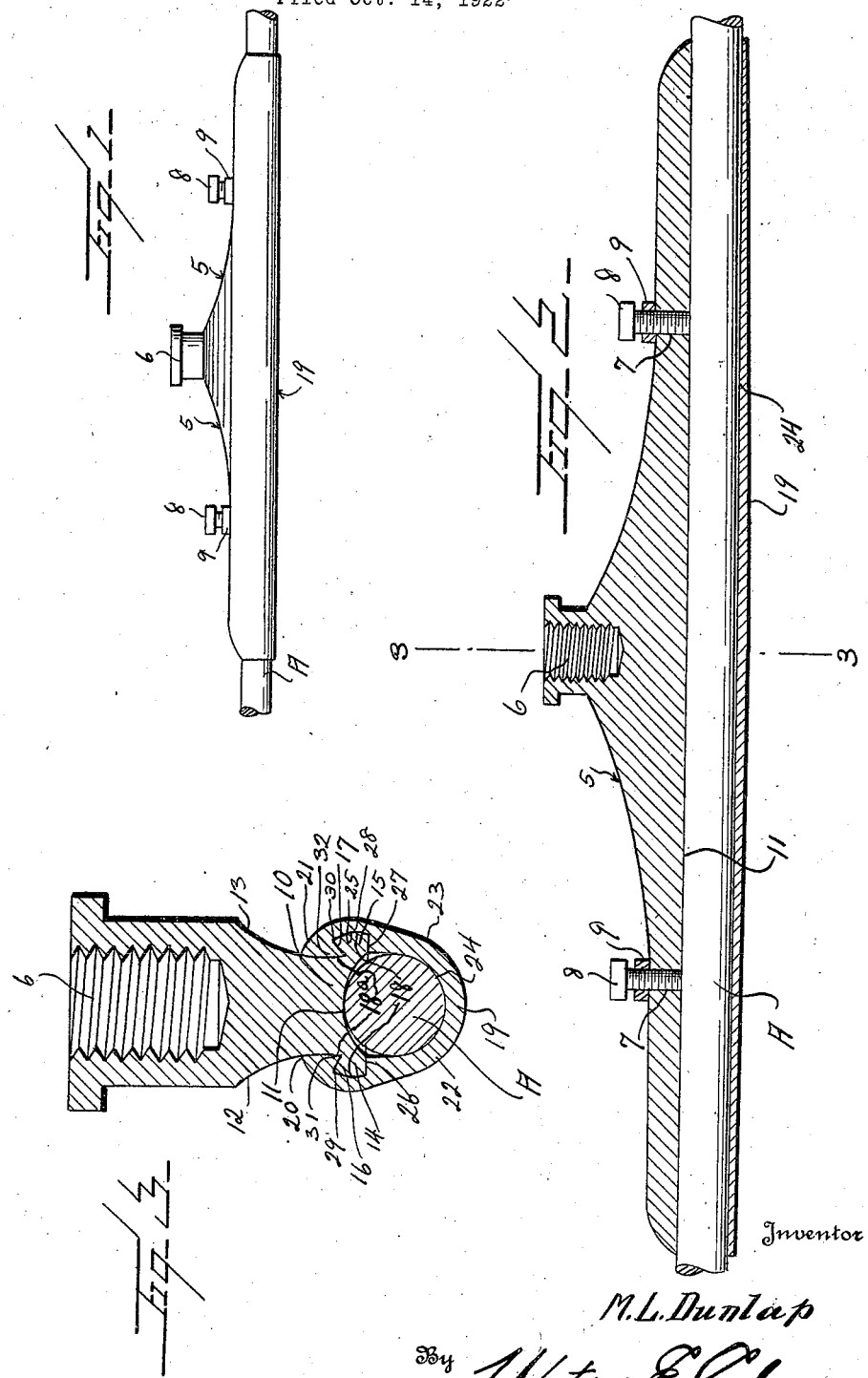

1,448,437

UNITED STATES PATENT OFFICE.

MARVIN L. DUNLAP, OF PHILIPSBURG, PENNSYLVANIA.

TROLLEY-WIRE HOLDER.

Application filed October 14, 1922. Serial No. 594,490.

*To all whom it may concern:*

Be it known that I, MARVIN L. DUNLAP, a citizen of the United States, residing at Philipsburg, in the county of Center and State of Pennsylvania, have invented certain new and useful Improvements in Trolley-Wire Holders, of which the following is a specification, reference being had to the accompanying drawings.

This invention relates to trolley wire holders and has for its object to provide a device of this character wherein the trolley wire may be attached and detached from the holder without removing the holder from its support and without damaging the holder.

It is also an object of the invention to provide a device of this character composed of sections adapted to embrace a trolley wire.

It is a further object of the invention to provide a device of this character wherein one section is arranged for connection to a support and another section arranged for detachable connection to the supported section.

With these and other objects in view, the invention consists in the improved construction and arrangement of parts to be hereinafter more particularly described, fully claimed and illustrated in the accompanying drawings, in which:—

Figure 1 is a side elevation of a trolley wire holder constructed in accordance with an embodiment of the invention;

Figure 2 is a longitudinal sectional view of the structure shown in Figure 1; and Figure 3 is a section taken on the line 3—3 of Figure 2.

Referring to the drawings, 5 designates an elongated body member which forms the main section of the holder. Projecting from the central portion of the top of the body member 5 is a socket member 6 which is interiorly threaded for connection to a trolley wire hanger or like supporting means. It it of course obvious that this holder can be used independently of the hanger. The upper portion of the body member 5 tapers downwardly from the socket member in opposite directions to the ends thereof. Each end portion of the body member has a threaded socket 7 for the reception of a set screw 8, said set screw having a lock nut 9 engaged therewith and with the body member to lock the set screw in position.

The lower face 10 of the body member is provided with a longitudinally extending recess 11, said recess being transversely curved to receive a portion of a trolley wire A.

The side portions 12 and 13 of the body member are provided with outwardly projecting flanges 14 and 15. The upper face of each flange is cut away to provide lips 16 and 17 which extend toward the socket member, the outer face 18 of each flange being curved. By the formation of the lips a recess 18ª is substantially formed between the sides of the body member and the inner face of the lips for a purpose to be hereinafter described.

In connection with the body member or main section of the holder a second section, or holding member 19 is provided. The holding member consists of an elongated length of material substantially U-shaped in cross section, said holding member tapering from its central portion to each end thereof so as to reinforce said central portion. The longitudinal edges 20 and 21 are disposed substantially in spaced parallel relation to each other. The intermediate portion of the sides 22 and 23 of the holding member are enlarged and constructed to provide a substantially circular recess 24 adapted to coact with the recess 11 to provide a circular passage for the trolley wire A. That portion of each of the sides 22 and 23, inwardly of the edges 20 and 21, is provided with a longitudinally extending groove 25, said groove providing shoulders 26 and 27 adapted to engage the lower face of the flanges 14 and 15 of the main section. The inner wall 28 of the groove 25 is curved in accordance with the curvature of the outer faces of the flanges 14 and 15. The upper walls 29 and 30 of each groove 25 are under cut to provide lips 31 and 32 adapted to enter the recess 18ª of the flanges 14 and 15.

In the application of the holder the main section 5 is attached to the hanger or suspension means and the trolley wire placed within the groove 11. The holding member 19 is then applied to the wire so that the wire rests upon the bottom of the recess 24. The holding member is then moved longitudinally toward the adjacent end of the body member so as to permit the flanges 14 and 15 of the body member to enter the grooves 25 and permit the interengagement of the lips 31 and 32 and the lips 16 and 17. The longitudinal movement of the holding member is then continued until the ends of the holding member substantially coincide with the ends of the body member, thereby firmly clamping the wire and permitting the device to entirely surround the wire. The set screws 8 are then tightened so as to bind the trolley wire A within the passage and prevent relative movement of the holder and the trolley wire. The tightening of the trolley wire within the device by means of the set screws also permits clamping of the holding member on the lips of the flanges in view of the pressure of the trolley wire on the arm of the holding member. Should adjustment of the trolley wire relative to the holder be required after the wire is applied it is only necessary to loosen the set screw 7 and remove the holding member to permit movement of the wire within the device to its adjusted position. The holding member may then be moved to its former position and the set screws tightened.

From the foregoing it will be readily seen that this invention provides a novel form of trolley wire holder which is simple in construction, capable of entirely surrounding the wire and holding the same against movement, and wherein the holder may be applied and removed as often as necessary without damaging the holder or the wire and without destroying the clamping function of the device. All of these features are possessed by a device which is simple in construction and which requires only a small amount of effort and time on the part of the operator to apply. This device is also adapted for use in mines.

What is claimed is:—

1. A trolley wire holder comprising a body member having a longitudinally extending recess in its lower face, a flange projecting from each side portion of the holding member adjacent the lower face of the holding member, each of said flanges having an upwardly projecting lip, a holding member having a longitudinally extending channel, said holding member being open at its upper portion, grooves formed in the side walls of the channel adjacent the upper portion of said holding member, lips depending from the upper walls of said grooves, said grooves being adapted to receive the flanges of the body member, the lips of the body member being adapted to engage the lips of the holding member, the channel of the holding member coacting with the recess of the body member to provide an uninterrupted substantially circular passage for a trolley wire.

2. A trolley wire holder comprising a body member having a longitudinally extending recess in its lower face, a flange projecting from each side portion of the holding member adjacent the lower face of the holding member, each of said flanges having an upwardly projecting lip, a holding member having a longitudinally extending channel, said holding member being open at its upper portion, grooves formed in the side walls of the channel adjacent the upper portion of said holding member, lips depending from the upper walls of said grooves, said grooves being adapted to receive the flanges of the body member, the lips of the body member being adapted to engage the lips of the holding member, the channel of the holding member coacting with the recess of the body member to provide an uninterrupted substantially circular passage for a trolley wire, and fastening means carried by the body member and adapted to engage the trolley wire within the passage.

In testimony whereof I hereunto affix my signature.

MARVIN L. DUNLAP.